US007551425B2

(12) United States Patent
Byrne

(10) Patent No.: US 7,551,425 B2
(45) Date of Patent: Jun. 23, 2009

(54) APPARATUS AND METHOD FOR DISTRIBUTING ELECTRICAL POWER FROM A PLURALITY OF POWER SOURCES AMONG A PLURALITY OF ELECTRICAL CONDUCTORS

(75) Inventor: Vincent Mark Byrne, Mesquite, TX (US)

(73) Assignee: Lineage Power Corporation, Mesquite, TX (US)

( * ) Notice: Subject to any disclaimer, the term of this patent is extended or adjusted under 35 U.S.C. 154(b) by 630 days.

(21) Appl. No.: 11/452,557

(22) Filed: Jun. 13, 2006

(65) Prior Publication Data

US 2007/0205663 A1 Sep. 6, 2007

Related U.S. Application Data

(60) Provisional application No. 60/778,295, filed on Mar. 2, 2006.

(51) Int. Cl.
*H02B 1/04* (2006.01)

(52) U.S. Cl. ....................... 361/622; 361/624; 361/636; 361/637; 361/639; 361/640; 361/648; 361/652; 361/657; 174/68.2; 174/71 B; 174/72 B; 174/84 R; 174/88 B; 174/88 S

(58) Field of Classification Search ......... 361/600–602, 361/605, 611, 614, 622, 624, 628–648, 673, 361/650–657, 807–810, 832; 174/66, 67, 174/59, 60, 68.2, 71 B, 72 B, 84 R, 88 B, 174/88 S; 439/527, 530, 110; 200/50.01, 200/168 K, 50.02, 50 AA, 48 R, 48 V, 144, 200/166 R, 168 R; 307/147, 151; 312/223.2, 312/223.3
See application file for complete search history.

(56) References Cited

U.S. PATENT DOCUMENTS

| | | | | |
|---|---|---|---|---|
| 3,793,564 | A * | 2/1974 | Salvati et al. | 361/614 |
| 4,121,276 | A * | 10/1978 | Kovatch et al. | 361/614 |
| 4,176,243 | A * | 11/1979 | Kovatch et al. | 174/72 B |
| 4,205,892 | A * | 6/1980 | Clement et al. | 439/721 |
| 4,242,718 | A * | 12/1980 | Shariff et al. | 361/611 |
| 4,307,304 | A * | 12/1981 | Kovatch et al. | 307/147 |
| 6,317,311 | B1 * | 11/2001 | Middlehurst et al. | 361/637 |
| 6,489,567 | B2 * | 12/2002 | Zachrai | 174/149 B |
| 6,672,914 | B1 * | 1/2004 | Claprood | 439/876 |
| 6,870,103 | B1 * | 3/2005 | Wiant et al. | 174/68.2 |
| 6,934,147 | B2 * | 8/2005 | Miller et al. | 361/611 |
| 7,027,293 | B2 * | 4/2006 | Yang et al. | 361/673 |
| 7,334,315 | B2 * | 2/2008 | Wiant et al. | 29/592.1 |

* cited by examiner

*Primary Examiner*—Michael V Datskovskiy
(74) *Attorney, Agent, or Firm*—Law Office of Donald D. Mondul

(57) ABSTRACT

An apparatus for distributing electrical power from a plurality of power sources among a plurality of electrical conductors includes: (a) A plurality of power supply bus structures. Each respective power supply bus structure is coupled with at least one respective power source and presents a respective plurality of first electrical connection structures arranged in a respective first spaced array. (b) Each respective electrical conductor presents a respective plurality of second electrical connection structures arranged in a respective second spaced array. (c) At least one electrical bridging unit coupling a respective first electrical connection structure and a respective second electrical connection structure to establish electrical connection between a selected respective power supply bus structure and a selected respective electrical conductor.

20 Claims, 6 Drawing Sheets

APPARATUS AND METHOD FOR DISTRIBUTING ELECTRICAL POWER FROM A PLURALITY OF POWER SOURCES AMONG A PLURALITY OF ELECTRICAL CONDUCTORS

This application claims benefit of prior filed copending Provisional Patent Application Ser. No. 60/778,295, filed Mar. 2, 2006.

BACKGROUND OF THE INVENTION

The present invention is directed to electrical power distribution apparatuses, and especially to electrical power distribution apparatuses that effect distribution from a plurality of power sources to a plurality of electrical conductors using a plurality of electrical bus structures.

Some sites requiring electrical power such as, by way of example and not by way of limitation, telecommunication infrastructure sites require significant power from multiple power system busses. By way of further example, a wireless network cell site may require significant DC (Direct Current) electrical power from a nominal +24V (Volt) bus to power radio equipment and also require significant DC electrical power from a nominal −48V bus to power transmission equipment.

Electrical energy may be delivered from power systems at such sites by means of Power Distribution Apparatuses to receive power from one or more power sources and distribute the received power to a variety of load equipment devices. Power sources may include batteries, AC (Alternating Current) to DC converting power supplies, DC to DC converting power supplies, commercially-provided AC power, AC or DC generators, fuel cells, and other sources of electrical energy. Power is received from the power sources by the Power Distribution Apparatus and is conveyed from the Power Distribution Apparatus to load equipment via electrical conductors, such as electrical busses, as required.

A prior art Power Distribution Apparatus that requires multiple busses (such as the previous example which requires a +24V bus and a −48V bus) is generally configured to provide an independent subsystem for each bus. In the exemplary wireless network cell site referred to above, a Power Distribution Apparatus may include: (1) a +24V power distribution subsystem which receives power from +24V rectifiers (i.e., power supplies that convert commercial AC power to a +24 VDC output signal) and 24V batteries, and distributes the power through overcurrent protective devices such as fuses or circuit breakers to load equipment devices such as radio equipment, and (2) a −48V power distribution subsystem which receives power from 24/48V converters (i.e., power supplies that convert a 24 VDC input signal to a 48 VDC output signal) and distributes the power through overcurrent protective devices such as fuses or circuit breakers to load equipment devices such as transmission equipment.

In most such conventional Power Distribution Apparatuses, the independent subsections or subsystems are fixed and dedicated. In the most common embodiment of the exemplary wireless network cell site referred to above, the Power Distribution Apparatus includes a +24V circuit breaker panel and a separate −48V circuit breaker panel. In another common embodiment of the exemplary wireless network cell site referred to above, the Power Distribution Apparatus includes a circuit breaker panel with some breaker positions configured for +24V operation and other breaker positions configured for −48V operation.

In some prior art Power Distribution Apparatuses subsections within the system can be independently configured between the busses. In a common embodiment of the previous example, two breaker position subsections within a circuit breaker panel can be independently configured for +24V operation or configured for −48V operation.

While the conventionally designed prior art Power Distribution Apparatuses effectively deliver power, there are limitations with such designs. Cost, space utilization, reliability, and required skill level are areas for potential improvement.

In power systems with fixed and dedicated subsystems for each bus, the ratio of space dedicated to each subsystem is fixed so that excess space in one subsection cannot be reallocated to meet the needs of another subsection that requires more space.

Some prior art Power Distribution Apparatuses are configured with sections assigned to each bus. The sections require multiple parts and fasteners so that cost, complexity, and likelihood of error are increased, while reliability is decreased. Further, reassignment of a section to a different bus (if such reassignment is even possible) requires working with tools on equipment amid hazardous energy sites. To avoid working amid hazardous energy sites one may take revenue producing equipment out of service, but this alternative is costly.

There is a need for an apparatus and method for distributing electrical power from a plurality of power sources among a plurality of electrical conductors that requires no fixed ratio of load devices among electrical busses.

There is a need for an apparatus and method for distributing electrical power from a plurality of power sources among a plurality of electrical conductors that has respective device positions that may be individually assigned to a respective bus.

There is a need for an apparatus and method for distributing electrical power from a plurality of power sources among a plurality of electrical conductors that has respective device positions that may be individually assigned to a respective without requiring special skill, high risk, special tools or additional parts or fasteners.

SUMMARY OF THE INVENTION

An apparatus for distributing electrical power from a plurality of power sources among a plurality of electrical conductors includes: (a) A plurality of power supply bus structures. Each respective power supply bus structure is coupled with at least one respective power source and presents a respective plurality of first electrical connection structures arranged in a respective first spaced array. (b) Each respective electrical conductor presents a respective plurality of second electrical connection structures arranged in a respective second spaced array. (c) At least one electrical bridging unit coupling a respective first electrical connection structure and a respective second electrical connection structure to establish electrical connection between a selected respective power supply bus structure and a selected respective electrical conductor.

A method for distributing electrical power from a plurality of power sources among a plurality of electrical conductors includes the steps of: (a) in no particular order: (1) providing a plurality of power supply bus structures; each respective power supply bus structure being coupled with at least one respective power source and presenting a respective plurality of first electrical connection structures arranged in a respective first spaced array; (2) configuring each respective electrical conductor of the plurality of electrical conductors to present a respective plurality of second electrical connection structures arranged in a respective second spaced array; and (3) providing at least one electrical bridging unit; and (b) orienting a respective electrical bridging unit to effect electrical coupling between a respective first electrical connection structure and a respective second electrical connection structure to establish electrical connection between a selected respective power supply bus structure and a selected respective electrical conductor.

It is, therefore, an object of the present invention to provide an apparatus and method for distributing electrical power from a plurality of power sources among a plurality of electrical conductors that requires no fixed ratio of load devices among electrical busses.

It is a further object of the present invention to provide an apparatus and method for distributing electrical power from a plurality of power sources among a plurality of electrical conductors that has respective device positions that may be individually assigned to a respective bus.

It is still a further object of the present invention to provide an apparatus and method for distributing electrical power from a plurality of power sources among a plurality of electrical conductors that has respective device positions that may be individually assigned to a respective bus without requiring special skill, high risk, special tools or additional parts or fasteners.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

The term "locus" is intended herein to indicate a place, location, locality, locale, point, position, site, spot, volume, juncture, junction or other identifiable location-related zone in one or more dimensions. A locus in a physical apparatus may include, by way of example and not by way of limitation, a corner, intersection, curve, line, area, plane, volume or a portion of any of those features. A locus in an electrical apparatus may include, by way of example and not by way of limitation, a terminal, wire, circuit, circuit trace, circuit board, wiring board, pin, connector, component, collection of components, sub-component or other identifiable location-related area in one or more dimensions. A locus in a flow chart may include, by way of example and not by way of limitation, a juncture, step, site, function, query, response or other aspect, step, increment or an interstice between junctures, steps, sites, functions, queries, responses or other aspects of the flow or method represented by the chart.

Figure 1:
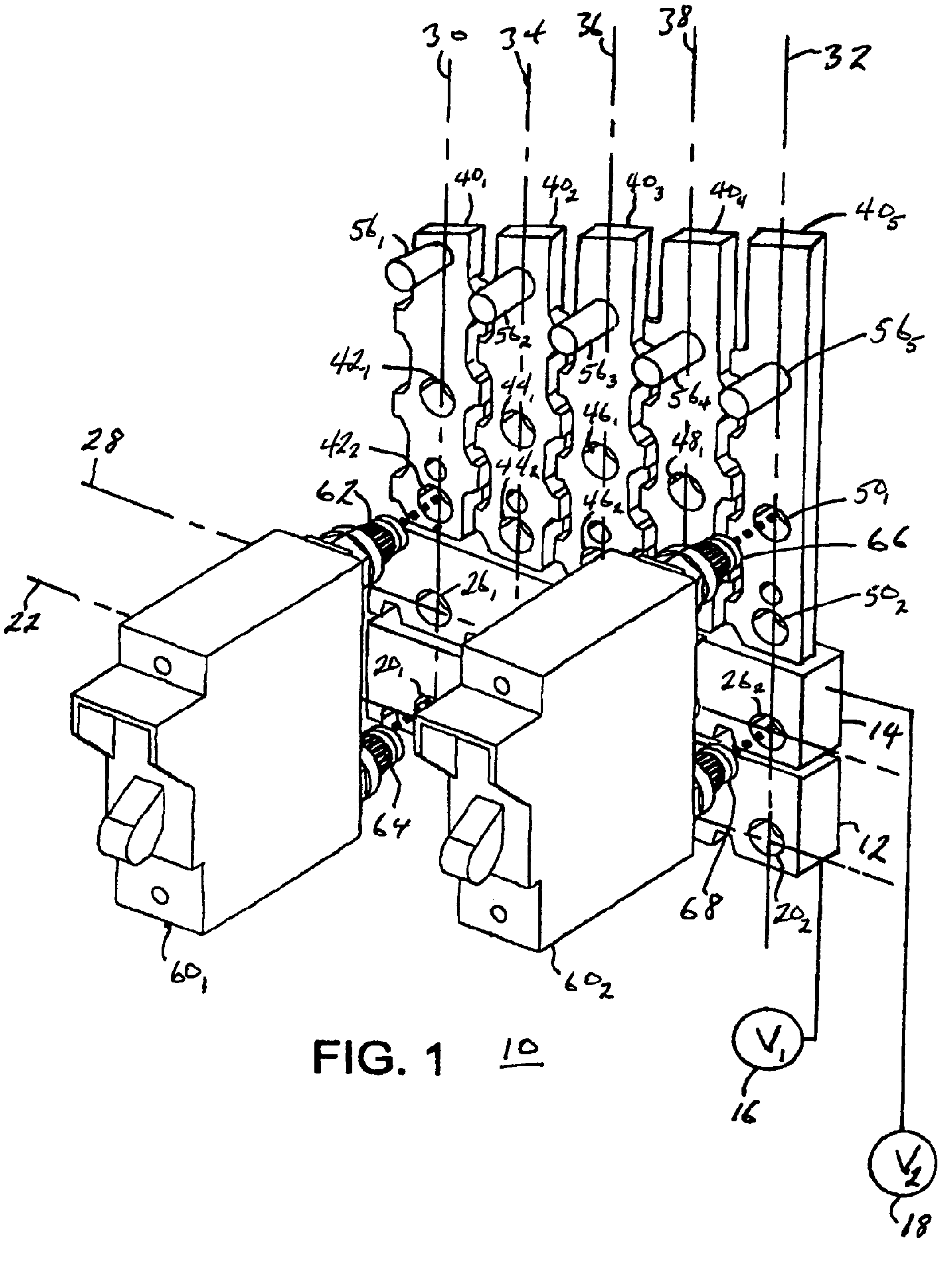
FIG. 1 is a perspective view of a preferred embodiment of the apparatus of the present invention.

FIG. 1 is a perspective view of a preferred embodiment of the apparatus of the present invention. In FIG. 1, an electrical power distribution apparatus 10 includes a first power supply bus structure 12 and a second power supply bus structure 14. First power supply bus structure 12 is coupled with a first power source 16 providing a supply voltage $V_1$. Second power supply bus structure 14 is coupled with a second power source 18 providing a supply voltage $V_2$. Power supply bus structures 12, 14 are electrically isolated from each other. Electrical isolation is effected in FIG. 1 by spacing power supply bus structures 12, 14 apart to establish an air gap between power supply bus structures 12, 14. Isolating structural barriers manufactured using insulating materials (not shown in FIG. 1) may be inserted between power supply bus structures 12, 14 to establish the required electrical isolation if desired.

First power supply bus structure 12 includes a plurality of electrical connection structures $\mathbf{20}_n$ (more than two electrical connection structures may be provided for first power supply bus structure 12; only two electrical connection structures $\mathbf{20}_1$, $\mathbf{20}_2$ are shown as visible in FIG. 1 for illustration purposes). Electrical connection structures $\mathbf{20}_n$ are arrayed generally symmetrically with respect to an axis 22. Electrical connection structures $\mathbf{20}_n$ are illustrated in a preferred embodiment in FIG. 1 as apertures traversing at least a portion of first power supply bus structure 12.

Second power supply bus structure 14 includes a plurality of electrical connection structures $\mathbf{26}_n$ (more than two electrical connection structures may be provided for second power supply bus structure 14; only two electrical connection structures $\mathbf{26}_1$, $\mathbf{26}_2$ are shown as visible in FIG. 1 for illustration purposes). Electrical connection structures $\mathbf{26}_n$ are arrayed generally symmetrically with respect to an axis 28. Electrical connection structures $\mathbf{26}_n$ are illustrated in a preferred embodiment in FIG. 1 as apertures traversing at least a portion of second power supply bus structure 14.

Electrical connection structures $\mathbf{20}_1$, $\mathbf{26}_1$ are arrayed along an axis 30. Electrical connection structures $\mathbf{20}_2$, $\mathbf{26}_2$ are arrayed along an axis 32. Other sets of electrical connection structures $\mathbf{20}_n$, $\mathbf{26}_n$ arrayed on power supply bus structures 12, 14 (not visible in FIG. 1) may be arrayed along axes 34, 36, 38.

Apparatus 10 also includes a plurality of electrical conductors $\mathbf{40}_n$ (more than five electrical conductors may be provided for apparatus 10; only five electrical conductors $\mathbf{40}_1$, $\mathbf{40}_2$, $\mathbf{40}_3$, $\mathbf{40}_4$, $\mathbf{40}_5$ are shown in FIG. 1 for illustration purposes). Electrical conductors $\mathbf{40}_n$ are electrically isolated from each other and are electrically isolated from power supply bus structures 12, 14. Electrical isolation is effected in FIG. 1 by spacing electrical conductors $\mathbf{40}_n$ and power supply bus structures 12, 14 apart to establish air gaps among electrical conductors $\mathbf{40}_n$ and power supply bus structures 12, 14. Isolating structural barriers manufactured using insulating materials (not shown in FIG. 1) may be inserted among electrical conductors $\mathbf{40}_n$ and power supply bus structures 12, 14 to establish the required electrical isolation if desired.

Electrical conductor $\mathbf{40}_1$ includes a plurality of electrical connection structures $\mathbf{42}_n$ (more than two electrical connection structures may be provided for electrical conductor $\mathbf{40}_1$; only two electrical connection structures $\mathbf{42}_1$, $\mathbf{42}_2$ are shown as visible in FIG. 1 for illustration purposes). Electrical connection structures $\mathbf{42}_n$ are arrayed generally symmetrically with respect to axis 30. Electrical connection structures 42$_n$ are illustrated in a preferred embodiment in FIG. 1 as apertures traversing at least a portion of electrical conductor 40$_1$.

Electrical conductor 40$_2$ includes a plurality of electrical connection structures 44$_n$ (more than two electrical connection structures may be provided for electrical conductor 40$_2$; only two electrical connection structures 44$_1$, 44$_2$ are shown as visible in FIG. 1 for illustration purposes). Electrical connection structures 44$_n$ are arrayed generally symmetrically with respect to axis 34. Electrical connection structures 44$_n$ are illustrated in a preferred embodiment in FIG. 1 as apertures traversing at least a portion of electrical conductor 40$_2$.

Electrical conductor 40$_3$ includes a plurality of electrical connection structures 46$_n$ (more than two electrical connection structures may be provided for electrical conductor 40$_3$; only two electrical connection structures 46$_1$, 46$_2$ are shown as visible in FIG. 1 for illustration purposes). Electrical connection structures 46$_n$ are arrayed generally symmetrically with respect to axis 36. Electrical connection structures 46$_n$ are illustrated in a preferred embodiment in FIG. 1 as apertures traversing at least a portion of electrical conductor 40$_3$.

Electrical conductor 40$_4$ includes a plurality of electrical connection structures 48$_n$ (more than one electrical connection structure may be provided for electrical conductor 40$_4$; only one electrical connection structure 48$_1$ is shown as visible in FIG. 1 for illustration purposes). Electrical connection structures 48$_n$ are arrayed generally symmetrically with respect to axis 38. Electrical connection structures 48$_n$ are illustrated in a preferred embodiment in FIG. 1 as apertures traversing at least a portion of electrical conductor 40$_4$.

Electrical conductor 405 includes a plurality of electrical connection structures 50$_n$ (more than two electrical connection structures may be provided for electrical conductor 40$_5$; only two electrical connection structures 50$_1$, 50$_2$ are shown as visible in FIG. 1 for illustration purposes). Electrical connection structures 50$_n$ are arrayed generally symmetrically with respect to axis 32. Electrical connection structures 50$_n$ are illustrated in a preferred embodiment in FIG. 1 as apertures traversing at least a portion of electrical conductor 40$_5$.

Apparatus 10 further includes at least one electrical bridging unit 60$_n$ (more than two electrical bridging units may be provided for apparatus 10; only two electrical bridging units 60$_1$, 60$_2$ are shown in FIG. 1 for illustration purposes). Electrical bridging units 60$_n$ are configured to span a distance between a selected electrical connection structure 20$_n$ at first power supply bus structure 12 or a selected connection structure 22$_n$ at second power supply bus structure 14 and a selected electrical connection structure 42$_n$, 44$_n$, 46$_n$, 48$_n$, 50$_n$.

In FIG. 1, electrical bridging unit 601 is illustrated spanning a distance between electrical connection structures 20$_1$, 42$_2$. By way of example and not by way of limitation, electrical bridging unit 60$_1$ is equipped with pin structures 62, 64 for insertion within apertures embodying electrical connection structures 20$_1$, 42$_2$. It is by such insertion of pin structures 62, 64 within electrical connection structures 20$_1$, 42$_2$ that electrical connection may be established between first power supply bus structure 12 and electrical conductor 40$_1$. Connecting electrical connection structures 20$_1$, 42$_2$ effects providing of supply voltage $V_1$ from first power source 16 via first power supply bus structure 12 via electrical bridging unit 60$_1$. Other electrical connection structures may be employed for effecting the desired electrical connection without departing from the scope of the present invention. One may observe that if spacing between electrical connection structures 20$_1$, 26$_1$ is substantially the same as spacing between electrical connection structures 42$_1$, 42$_2$, then electrical bridging unit 60$_1$ may alternately be inserted within apertures embodying electrical connection structures 26$_1$, 42$_1$. It is by such insertion of pin structures 62, 64 within electrical connection structures 26$_1$, 42$_1$ that electrical connection may be established between second power supply bus structure 14 and electrical conductor 40$_1$. Connecting electrical connection structures 26$_1$, 42$_1$ effects providing of supply voltage $V_2$ from second power source 18 via second power supply bus structure 14 via electrical bridging unit 60$_1$.

In FIG. 1, electrical bridging unit 60$_2$ is illustrated spanning a distance between electrical connection structures 26$_2$, 50$_1$. By way of example and not by way of limitation, electrical bridging unit 60$_2$ is equipped with pin structures 66, 68 for insertion within apertures embodying electrical connection structures 26$_2$, 50$_1$. It is by such insertion of pin structures 66, 68 within electrical connection structures 26$_2$, 50$_1$ that electrical connection may be established between second power supply bus structure 14 and electrical conductor 40$_5$. Connecting electrical connection structures 26$_2$, 50$_1$ effects providing of supply voltage $V_2$ from second power source 18 via second power supply bus structure 14 via electrical bridging unit 60$_2$. Other electrical connection structures may be employed for effecting the desired electrical connection without departing from the scope of the present invention. One may observe that if spacing between electrical connection structures 20$_2$, 26$_2$ is substantially the same as spacing between electrical connection structures 50$_1$, 50$_2$, then electrical bridging unit 60$_2$ may alternately be inserted within apertures embodying electrical connection structures 20$_2$, 50$_2$. It is by such insertion of pin structures 66, 68 within electrical connection structures 20$_2$, 50$_2$ that electrical connection may be established between first power supply bus structure 12 and electrical conductor 40$_5$. Connecting electrical connection structures 20$_2$, 50$_2$ effects providing of supply voltage $V_1$ from first power source 16 via first power supply bus structure 12 via electrical bridging unit 60$_2$.

Electrical bridging units 60$_n$ are illustrated in FIG. 1 in a preferred embodiment as circuit interrupting units such as circuit breaker units. Other electrically conductive structures may as well be employed for use as electrical bridging units 60$_n$ without departing from the scope of the present invention.

Electrical conductors 40$_n$ preferably include circuit connection structures 56$_n$ (more than one circuit connection structure may be provided for each electrical conductor 40$_n$; only one electrical connection structure for each electrical conductor 40$_n$ (i.e., electrical connection structures 56$_1$, 56$_2$, 56$_3$, 56$_4$, 56$_5$) are shown in FIG. 1 for illustration purposes). Electrical connection structures 56$_n$ provide a coupling structure for connecting electrical conductors 40$_n$ to respective loads (not shown in FIG. 1) served by apparatus 10.

Figure 2:
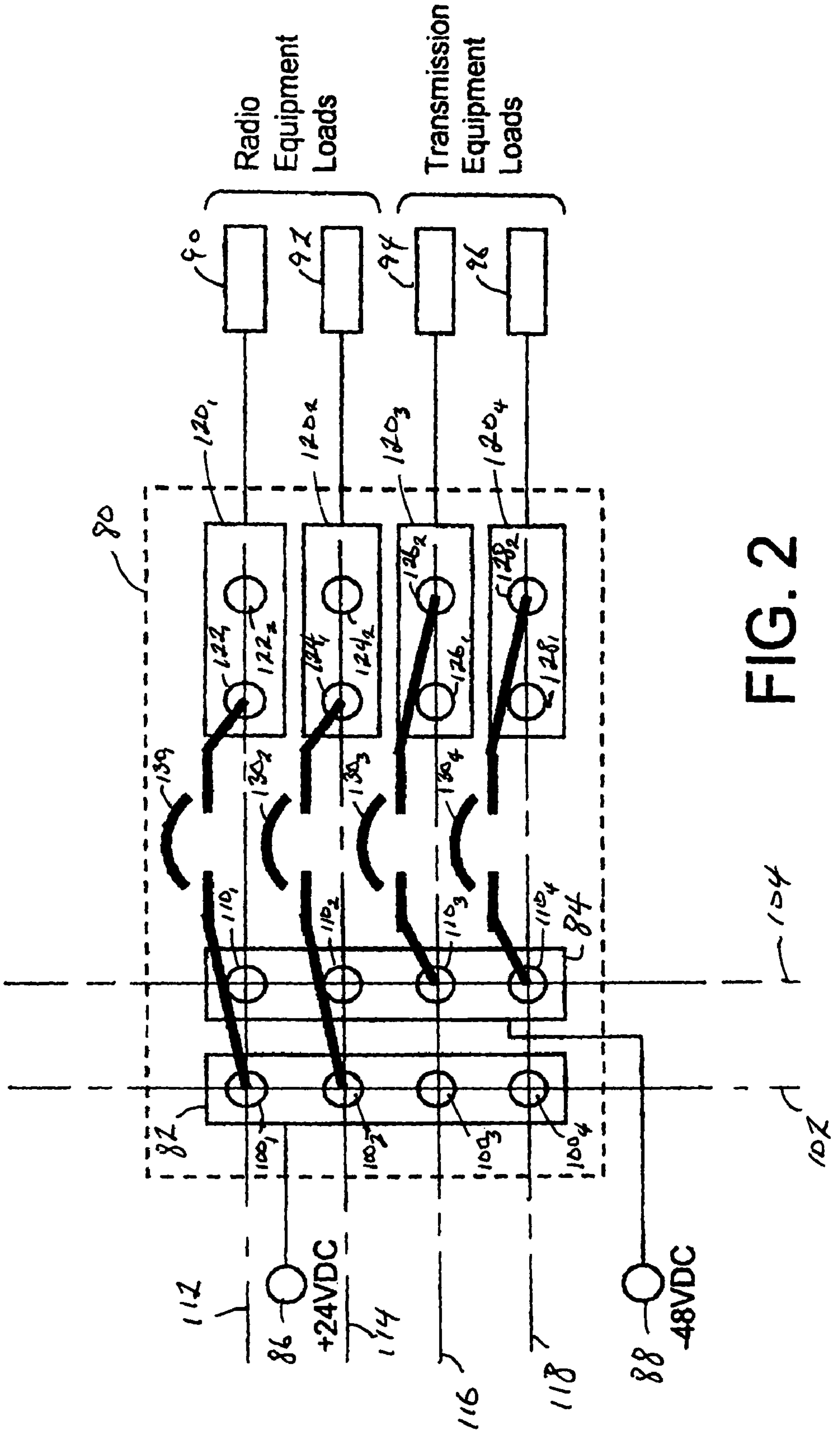
FIG. 2 is a schematic plan view of the apparatus of the present invention configured for operation as a dual voltage distribution system.

FIG. 2 is a schematic plan view of the apparatus of the present invention configured for operation as a dual voltage distribution system. In FIG. 2, an electrical power distribution apparatus 80 includes a first power supply bus structure 82 and a second power supply bus structure 84. By way of example and not by way of limitation, first power supply bus structure 82 is coupled with a first power source 86 providing +24 VDC (Volts Direct Current) and second power supply bus structure 84 is coupled with a second power source 88 providing −48 VDC. Further by way of example and not by way of limitation, a supplied power of +24 VDC is appropriate for radio equipment loads, indicated as loads 90, 92, and a supplied power of −48 VDC is appropriate for transmission equipment loads, indicated as loads 94, 96.

First power supply bus structure 82 includes a plurality of electrical connection structures 100$_n$ (more than four electrical connection structures may be provided for first power supply bus structure 82; only four electrical connection structures $\mathbf{100}_1$, $\mathbf{100}_2$, $\mathbf{100}_3$, $\mathbf{100}_4$ are shown in FIG. 2 for illustration purposes). Electrical connection structures $\mathbf{100}_n$ are arrayed generally symmetrically with respect to an axis 102. Electrical connection structures $\mathbf{100}_n$ are illustrated in a preferred embodiment in FIG. 2 as apertures traversing at least a portion of first power supply bus structure 82.

Second power supply bus structure 84 includes a plurality of electrical connection structures $\mathbf{110}_n$ (more than four electrical connection structures may be provided for second power supply bus structure 84; only four electrical connection structures $\mathbf{110}_1$, $\mathbf{110}_2$, $\mathbf{110}_3$, $\mathbf{110}_4$ are shown in FIG. 2 for illustration purposes). Electrical connection structures $\mathbf{110}_n$ are arrayed generally symmetrically with respect to an axis 104. Electrical connection structures $\mathbf{110}_n$ are illustrated in a preferred embodiment in FIG. 2 as apertures traversing at least a portion of second power supply bus structure 84.

Electrical connection structures $\mathbf{100}_1$, $\mathbf{110}_1$ are arrayed along an axis 112. Electrical connection structures $\mathbf{100}_2$, $\mathbf{110}_2$ are arrayed along an axis 114. Electrical connection structures $\mathbf{100}_3$, $\mathbf{110}_3$ are arrayed along an axis 116. Electrical connection structures $\mathbf{100}_4$, $\mathbf{110}_4$ are arrayed along an axis 118.

Electrical power distribution apparatus 80 also includes electrical conductors $\mathbf{120}_n$ (more than four electrical conductors may be provided; only four electrical connection structures $\mathbf{120}_1$, $\mathbf{120}_2$, $\mathbf{120}_3$, $\mathbf{120}_4$ are shown in FIG. 2 for illustration purposes).

Electrical conductor $\mathbf{120}_1$ includes a plurality of electrical connection structures $\mathbf{122}_n$ (more than two electrical connection structures may be provided for electrical conductor $\mathbf{120}_1$; only two electrical connection structures $\mathbf{122}_1$, $\mathbf{122}_2$ are shown in FIG. 2 for illustration purposes). Electrical connection structures $\mathbf{122}_n$ are arrayed generally symmetrically with respect to axis 112. Electrical connection structures $\mathbf{122}_n$ are illustrated in a preferred embodiment in FIG. 2 as apertures traversing at least a portion of electrical conductor $\mathbf{120}_1$.

Electrical conductor $\mathbf{120}_2$ includes a plurality of electrical connection structures $\mathbf{124}_n$ (more than two electrical connection structures may be provided for electrical conductor $\mathbf{120}_2$; only two electrical connection structures $\mathbf{124}_1$, $\mathbf{124}_2$ are shown in FIG. 2 for illustration purposes). Electrical connection structures $\mathbf{124}_n$ are arrayed generally symmetrically with respect to axis 114. Electrical connection structures $\mathbf{124}_n$ are illustrated in a preferred embodiment in FIG. 2 as apertures traversing at least a portion of electrical conductor $\mathbf{120}_2$.

Electrical conductor $\mathbf{120}_3$ includes a plurality of electrical connection structures $\mathbf{126}_n$ (more than two electrical connection structures may be provided for electrical conductor $\mathbf{120}_3$; only two electrical connection structures $\mathbf{126}_1$, $\mathbf{126}_2$ are shown as visible in FIG. 2 for illustration purposes). Electrical connection structures $\mathbf{126}_n$ are arrayed generally symmetrically with respect to axis 16. Electrical connection structures $\mathbf{126}_n$ are illustrated in a preferred embodiment in FIG. 2 as apertures traversing at least a portion of electrical conductor $\mathbf{120}_3$.

Electrical conductor $\mathbf{120}_4$ includes a plurality of electrical connection structures $\mathbf{128}_n$ (more than two electrical connection structures may be provided for electrical conductor $\mathbf{120}_4$; only two electrical connection structures $\mathbf{128}_1$, $\mathbf{128}_2$ are shown in FIG. 2 for illustration purposes). Electrical connection structures $\mathbf{128}_n$ are arrayed generally symmetrically with respect to axis 118. Electrical connection structures $\mathbf{128}_n$ are illustrated in a preferred embodiment in FIG. 2 as apertures traversing at least a portion of electrical conductor $\mathbf{120}_4$.

Apparatus 80 further includes electrical bridging units $\mathbf{130}_n$ (more than four electrical bridging units may be provided for apparatus 80; only four electrical bridging units $\mathbf{130}_1$, $\mathbf{130}_2$, $\mathbf{130}_3$, $\mathbf{130}_4$ are shown in FIG. 2 for illustration purposes). Electrical bridging units $\mathbf{130}_n$ are configured to span a distance between a selected electrical connection structure $\mathbf{100}_n$ at first power supply bus structure 82 or a selected connection structure $\mathbf{110}_n$ at second power supply bus structure 84 and a selected electrical connection structure $\mathbf{122}_n$, $\mathbf{124}_n$, $\mathbf{126}_n$, $\mathbf{128}_n$.

In FIG. 2, electrical bridging unit $\mathbf{130}_n$ is illustrated spanning a distance between electrical connection structures $\mathbf{100}_1$, $\mathbf{122}_1$. Connecting electrical connection structures $\mathbf{100}_1$, $\mathbf{12}_2$, effects providing of supply voltage +24 VDC from first power source 86 via first power supply bus structure 82 via electrical bridging unit $\mathbf{130}_1$ and via electrical conductor $\mathbf{120}_1$ to radio equipment load 90. One may observe that if spacing between electrical connection structures $\mathbf{100}_1$, $\mathbf{110}_1$ is substantially the same as spacing between electrical connection structures $\mathbf{122}_1$, $\mathbf{122}_2$, then electrical bridging unit $\mathbf{130}_1$ may alternately be employed to couple electrical connection structures $\mathbf{110}_1$, $\mathbf{122}_2$. It is by such connection between electrical connection structures $\mathbf{110}_1$, $\mathbf{122}_2$ that electrical connection may be established between second power supply bus structure 84 and electrical conductor $\mathbf{120}_1$. Connecting electrical connection structures $\mathbf{110}_1$, $\mathbf{122}_2$ effects providing of supply voltage −48 VDC from second power source 88 via second power supply bus structure 84 via electrical bridging unit $\mathbf{130}_1$ and via electrical conductor $\mathbf{120}_1$ to radio equipment load 90.

In FIG. 2, electrical bridging unit $\mathbf{130}_2$ is illustrated spanning a distance between electrical connection structures $\mathbf{100}_2$, $\mathbf{124}_1$. Connecting electrical connection structures $\mathbf{100}_2$, $\mathbf{124}_1$ effects providing of supply voltage +24 VDC from first power source 86 via first power supply bus structure 82 via electrical bridging unit $\mathbf{130}_2$ and via electrical conductor $\mathbf{120}_2$ to radio equipment load 92. One may observe that if spacing between electrical connection structures $\mathbf{100}_2$, $\mathbf{110}_2$ is substantially the same as spacing between electrical connection structures $\mathbf{124}_1$, $\mathbf{124}_2$, then electrical bridging unit $\mathbf{130}_2$ may alternately employed to couple electrical connection structures $\mathbf{110}_2$, $\mathbf{124}_2$. It is by such connection between electrical connection structures $\mathbf{110}_2$, $\mathbf{124}_2$ that electrical connection may be established between second power supply bus structure 84 and electrical conductor $\mathbf{120}_2$. Connecting electrical connection structures $\mathbf{110}_2$, $\mathbf{124}_2$ effects providing of supply voltage −48 VDC from second power source 88 via second power supply bus structure 84 via electrical bridging unit $\mathbf{130}_2$ via electrical conductor $\mathbf{120}_2$ to radio equipment load 92.

In FIG. 2, electrical bridging unit $\mathbf{130}_3$ is illustrated spanning a distance between electrical connection structures $\mathbf{110}_3$, $\mathbf{126}_2$. Connecting electrical connection structures $\mathbf{110}_3$, $\mathbf{126}_2$ effects providing of supply voltage −48 VDC from second power source 88 via second power supply bus structure 84 via electrical bridging unit $\mathbf{130}_3$ via electrical conductor $\mathbf{120}_3$ to transmission equipment load 94. One may observe that if spacing between electrical connection structures $\mathbf{100}_3$, $\mathbf{110}_3$ is substantially the same as spacing between electrical connection structures $\mathbf{126}_1$, $\mathbf{126}_2$, then electrical bridging unit $\mathbf{130}_3$ may alternately employed to couple electrical connection structures $\mathbf{100}_3$, $\mathbf{126}_1$. It is by such connection between electrical connection structures $\mathbf{100}_3$, $\mathbf{126}_1$ that electrical connection may be established between first power supply bus structure 82 and electrical conductor $\mathbf{120}_3$. Connecting electrical connection structures $\mathbf{100}_3$, $\mathbf{126}_1$ effects providing of supply voltage +24 VDC from first power source 86 via first power supply bus structure 82 via electrical bridging unit $\mathbf{130}_3$ via electrical conductor $\mathbf{120}_3$ to transmission equipment load 94.

In FIG. 2, electrical bridging unit 130$_4$ is illustrated spanning a distance between electrical connection structures 110$_4$, 128$_2$. Connecting electrical connection structures 110$_4$, 128$_2$ effects providing of supply voltage −48 VDC from second power source 88 via second power supply bus structure 84 via electrical bridging unit 130$_4$ via electrical conductor 120$_4$ to transmission equipment load 96. One may observe that if spacing between electrical connection structures 100$_4$, 110$_4$ is substantially the same as spacing between electrical connection structures 128$_1$, 128$_2$, then electrical bridging unit 130$_4$ may alternately employed to couple electrical connection structures 100$_4$, 128$_1$. It is by such connection between electrical connection structures 100$_4$, 128$_1$ that electrical connection may be established between first power supply bus structure 82 and electrical conductor 120$_4$. Connecting electrical connection structures 100$_4$, 128$_1$ effects providing of supply voltage +24 VDC from first power source 86 via first power supply bus structure 82 via electrical bridging unit 130$_4$ via electrical conductor 120$_4$ to transmission equipment load 96.

Electrical bridging units 130$_n$ are illustrated in FIG. 2 in a preferred embodiment as circuit interrupting units such as circuit breaker units. Other embodiments may as well be employed for use as electrical bridging units 130$_n$ without departing from the scope of the present invention.

Figure 3:
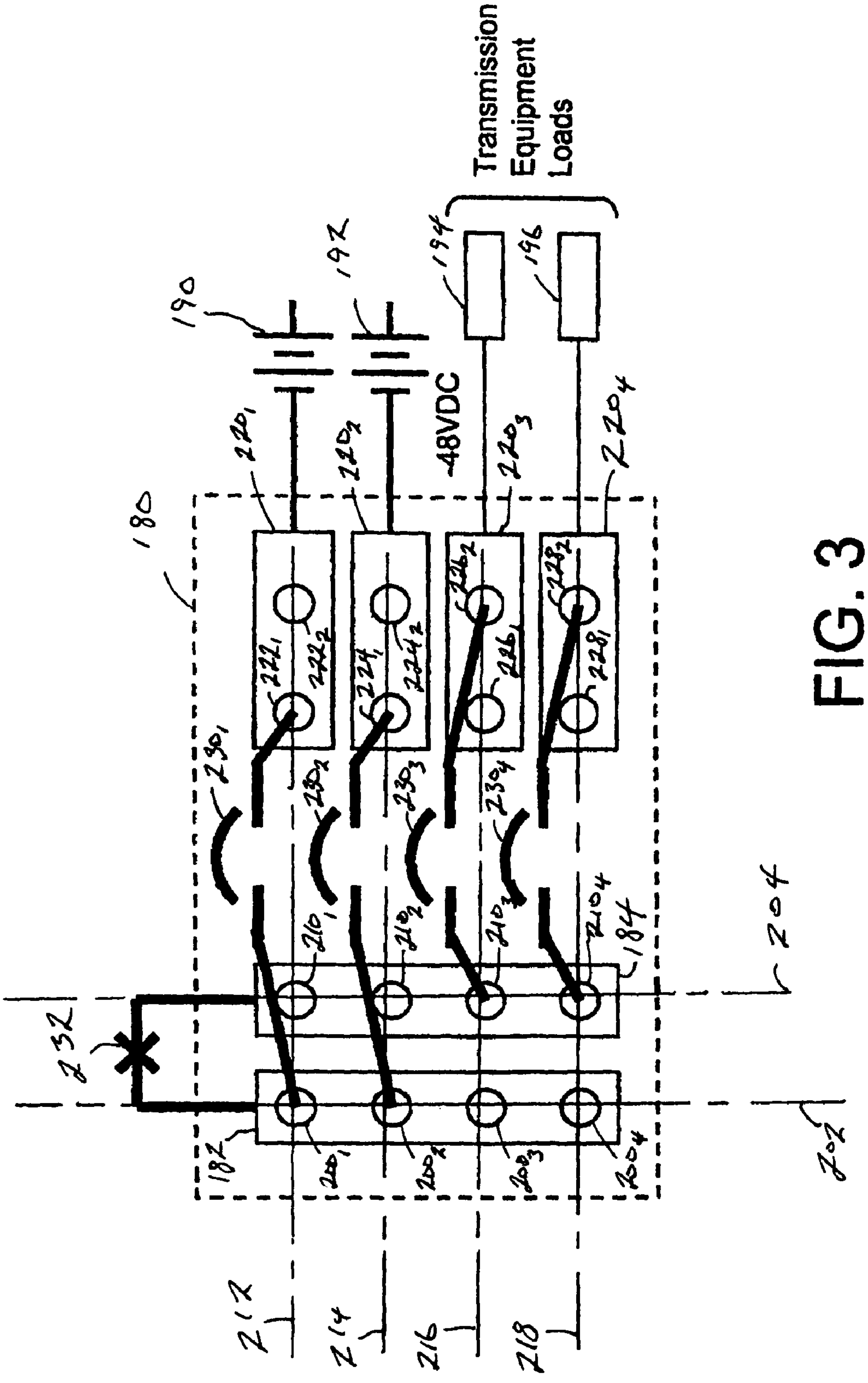
FIG. 3 is a schematic plan view of the apparatus of the present invention configured for operation as a battery power input distribution system.

FIG. 3 is a schematic plan view of the apparatus of the present invention configured for operation as a battery power input distribution system. In FIG. 3, an electrical power distribution apparatus 180 includes a first power supply bus structure 182 and a second power supply bus structure 184. First power supply bus structure 82 includes a plurality of electrical connection structures 200$_n$ (more than four electrical connection structures may be provided for first power supply bus structure 182; only four electrical connection structures 200$_1$, 200$_2$, 200$_3$, 200$_4$ are shown in FIG. 3 for illustration purposes). Electrical connection structures 200$_n$ are arrayed generally symmetrically with respect to an axis 202. Electrical connection structures 200$_n$ are illustrated in a preferred embodiment in FIG. 3 as apertures traversing at least a portion of first power supply bus structure 182.

Second power supply bus structure 184 includes a plurality of electrical connection structures 210$_n$ (more than four electrical connection structures may be provided for second power supply bus structure 184; only four electrical connection structures 210$_1$, 210$_2$, 210$_3$, 210$_4$ are shown in FIG. 3 for illustration purposes). Electrical connection structures 210$_n$ are arrayed generally symmetrically with respect to an axis 204. Electrical connection structures 210$_n$ are illustrated in a preferred embodiment in FIG. 3 as apertures traversing at least a portion of second power supply bus structure 184.

Electrical connection structures 200$_1$, 210$_1$ are arrayed along an axis 212. Electrical connection structures 200$_2$, 210$_2$ are arrayed along an axis 214. Electrical connection structures 200$_3$, 210$_3$ are arrayed along an axis 216. Electrical connection structures 200$_4$, 210$_4$ are arrayed along an axis 218.

Electrical power distribution apparatus 180 also includes electrical conductors 220$_n$ (more than four electrical conductors may be provided; only four electrical connection structures 220$_1$, 220$_2$, 220$_3$, 220$_4$ are shown in FIG. 3 for illustration purposes).

By way of example and not by way of limitation, electrical conductor 220$_1$ is coupled with a first power source 190 providing −48 VDC (Volts Direct Current). Electrical conductor 220$_1$ includes a plurality of electrical connection structures 222$_n$ (more than two electrical connection structures may be provided for electrical conductor 220$_1$; only two electrical connection structures 222$_1$, 222$_2$ are shown in FIG. 3 for illustration purposes). Electrical connection structures 222$_n$ are arrayed generally symmetrically with respect to axis 21$_2$. Electrical connection structures 222$_n$ are illustrated in a preferred embodiment in FIG. 3 as apertures traversing at least a portion of electrical conductor 220$_1$.

By way of example and not by way of limitation, electrical conductor 220$_2$ is coupled with a second power source 192 providing −48 VDC (Volts Direct Current). Electrical conductor 220$_2$ includes a plurality of electrical connection structures 224$_n$ (more than two electrical connection structures may be provided for electrical conductor 220$_2$; only two electrical connection structures 224$_1$, 224$_2$ are shown in FIG. 3 for illustration purposes). Electrical connection structures 224$_n$ are arrayed generally symmetrically with respect to axis 214. Electrical connection structures 224$_n$ are illustrated in a preferred embodiment in FIG. 3as apertures traversing at least a portion of electrical conductor 220$_2$.

By way of example and not by way of limitation, electrical conductor 220$_3$ is coupled with a transmission equipment load 194. Electrical conductor 220$_3$ includes a plurality of electrical connection structures 226$_n$ (more than two electrical connection structures may be provided for electrical conductor 220$_3$; only two electrical connection structures 226$_1$, 226$_2$ are shown as visible in FIG. 3 for illustration purposes). Electrical connection structures 226$_n$ are arrayed generally symmetrically with respect to axis 216. Electrical connection structures 226$_n$ are illustrated in a preferred embodiment in FIG. 3 as apertures traversing at least a portion of electrical conductor 220$_3$.

By way of example and not by way of limitation, electrical conductor 220$_4$ is coupled with a transmission equipment load 196. Electrical conductor 220$_4$ includes a plurality of electrical connection structures 228$_n$ (more than two electrical connection structures may be provided for electrical conductor 220$_4$; only two electrical connection structures 228$_1$, 228$_2$ are shown in FIG. 3 for illustration purposes). Electrical connection structures 228$_n$ are arrayed generally symmetrically with respect to axis 218. Electrical connection structures 228$_n$ are illustrated in a preferred embodiment in FIG. 3 as apertures traversing at least a portion of electrical conductor 220$_4$.

Apparatus 180 further includes electrical bridging units 230$_n$ (more than four electrical bridging units may be provided for apparatus 180; only four electrical bridging units 230$_1$, 230$_2$, 230$_3$, 230$_4$ are shown in FIG. 3 for illustration purposes). Electrical bridging units 230$_n$ are configured to span a distance between a selected electrical connection structure 200$_n$ at first power supply bus structure 182 or a selected connection structure 210$_n$ at second power supply bus structure 184 and a selected electrical connection structure 222$_n$, 224$_n$, 226$_n$, 228$_n$.

Apparatus 180 still further includes a disconnect switch 232 coupling power supply bus structures 182, 184.

In FIG. 3, electrical bridging unit 230$_1$ is illustrated spanning a distance between electrical connection structures 200$_1$, 222$_1$. Electrical bridging unit 230$_2$ spans a distance between electrical connection structures 200$_2$, 224$_1$. Electrical bridging unit 230$_3$ spans a distance between electrical connection structures 210$_3$, 226$_2$. Electrical bridging unit 230$_4$ spans a distance between electrical connection structures 210$_4$, 228$_2$. Connecting electrical connection structures 200$_1$, 222$_1$ effects providing of supply voltage −48 VDC from first power source 190 via electrical conductor 220$_1$ via electrical bridging unit 230$_1$ via first power supply bus structure 182 via disconnect switch 232 (when closed) via second power supply bus structure 184 via electrical bridging units 230$_3$, 230$_4$ to transmission equipment loads 194, 196. Connecting electrical connection structures 200$_2$, 224$_1$ effects providing of supply voltage −48 VDC from second power source 192 via electrical conductor 220$_2$ via electrical bridging unit 230$_2$ via first power supply bus structure 182 via disconnect switch 232 (when closed) via second power supply bus structure 184 via electrical bridging units 230$_3$, 230$_4$ to transmission equipment loads 194, 196.

Electrical bridging units 230$_n$ are illustrated in FIG. 3 in a preferred embodiment as circuit interrupting units such as circuit breaker units. Other embodiments may as well be employed for use as electrical bridging units 230$_n$ without departing from the scope of the present invention.

Figure 4:
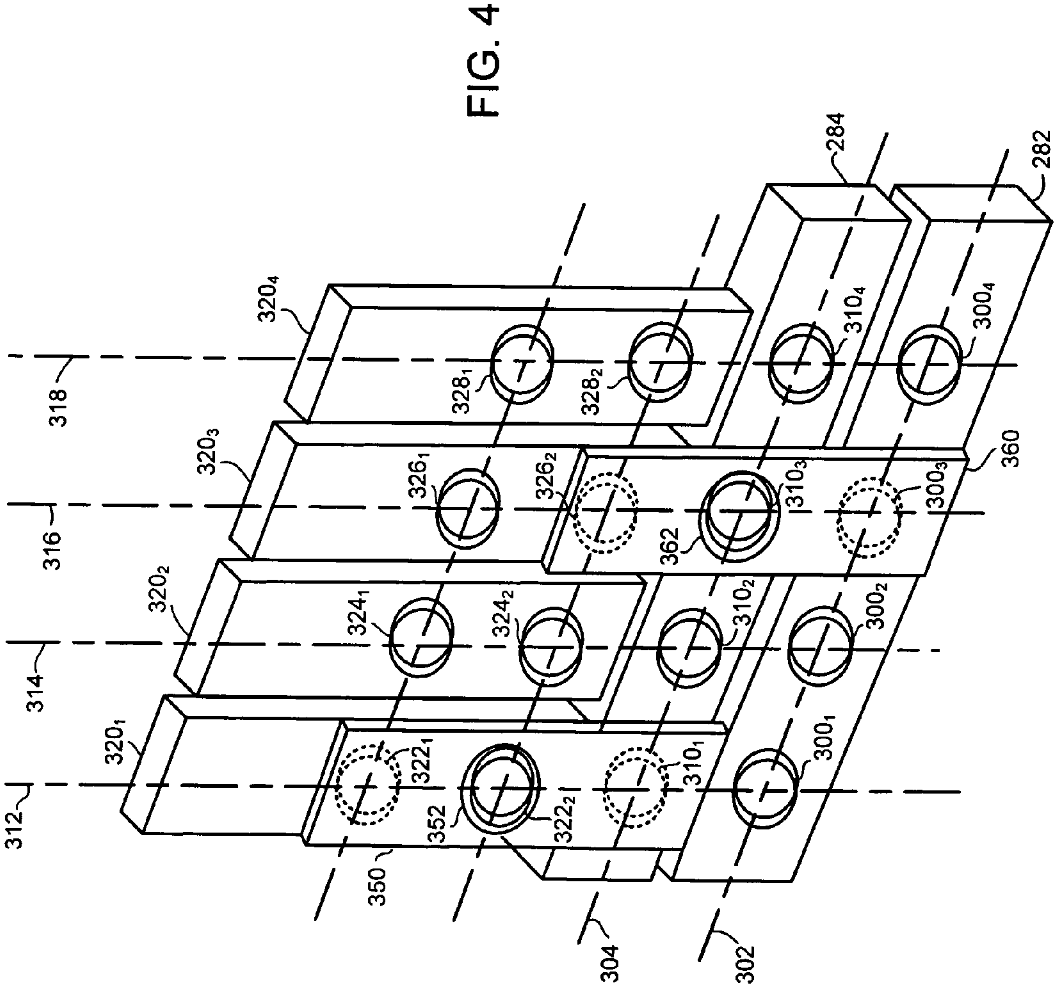
FIG. 4 is a perspective view of the apparatus of the present invention configured with sliding access panels for ensuring proper line-up of load devices.

FIG. 4 is a perspective view of the apparatus of the present invention configured with sliding access panels for ensuring proper line-up of load devices. In FIG. 4, a first power supply bus structure 282 includes a plurality of electrical connection structures 300$_n$ (more than four electrical connection structures may be provided for first power supply bus structure 282; only four electrical connection structures 300$_1$, 300$_2$, 300$_3$, 300$_4$ are shown in FIG. 4 for illustration purposes). Electrical connection structures 300$_n$ are arrayed generally symmetrically with respect to an axis 302. Electrical connection structures 300$_n$ are illustrated in a preferred embodiment in FIG. 4 as apertures traversing at least a portion of first power supply bus structure 282.

A second power supply bus structure 284 includes a plurality of electrical connection structures 310$_n$ (more than four electrical connection structures may be provided for second power supply bus structure 284; only four electrical connection structures 310$_1$, 310$_2$, 310$_3$, 310$_4$ are shown in FIG. 4 for illustration purposes). Electrical connection structures 310$_n$ are arrayed generally symmetrically with respect to an axis 304. Electrical connection structures 310$_n$ are illustrated in a preferred embodiment in FIG. 4 as apertures traversing at least a portion of first power supply bus structure 284.

Power supply bus structures 282, 284 are electrically isolated from each other. Electrical isolation is effected in FIG. 4 by spacing power supply bus structures 282, 284 apart to establish an air gap between power supply bus structures 282, 284. Isolating structural barriers manufactured using insulating materials (not shown in FIG. 4) may be inserted between power supply bus structures 282, 284 to establish the required electrical isolation if desired.

Electrical connection structures 300$_1$, 310$_1$ are arrayed along an axis 312. Electrical connection structures 300$_2$, 310$_2$ are arrayed along an axis 314. Electrical connection structures 300$_3$, 310$_3$ are arrayed along an axis 316. Electrical connection structures 300$_4$, 310$_4$ are arrayed along an axis 318.

Electrical conductors 320$_n$ (more than four electrical conductors may be provided; only four electrical connection structures 320$_1$, 320$_2$, 320$_3$, 320$_4$ are shown in FIG. 4 for illustration purposes).

Electrical conductor 320$_1$ includes a plurality of electrical connection structures 322$_n$ (more than two electrical connection structures may be provided for electrical conductor 320$_1$; only two electrical connection structures 322$_1$, 322$_2$ are shown in FIG. 4 for illustration purposes). Electrical connection structures 322$_n$ are arrayed generally symmetrically with respect to axis 312. Electrical connection structures 322$_n$ are illustrated in a preferred embodiment in FIG. 4 as apertures traversing at least a portion of electrical conductor 320$_1$.

Electrical conductor 320$_2$ includes a plurality of electrical connection structures 324$_n$ (more than two electrical connection structures may be provided for electrical conductor 320$_2$; only two electrical connection structures 324$_1$, 324$_2$ are shown in FIG. 4 for illustration purposes). Electrical connection structures 324$_n$ are arrayed generally symmetrically with respect to axis 314. Electrical connection structures 324$_n$ are illustrated in a preferred embodiment in FIG. 4 as apertures traversing at least a portion of electrical conductor 320$_2$.

Electrical conductor 320$_3$ includes a plurality of electrical connection structures 326$_n$ (more than two electrical connection structures may be provided for electrical conductor 320$_3$; only two electrical connection structures 326$_1$, 326$_2$ are shown as visible in FIG. 4 for illustration purposes). Electrical connection structures 326$_n$ are arrayed generally symmetrically with respect to axis 316. Electrical connection structures 326$_n$ are illustrated in a preferred embodiment in FIG. 4 as apertures traversing at least a portion of electrical conductor 320$_3$.

Electrical conductor 320$_4$ includes a plurality of electrical connection structures 328$_n$ (more than two electrical connection structures may be provided for electrical conductor 320$_4$; only two electrical connection structures 328$_1$, 328$_2$ are shown in FIG. 4 for illustration purposes). Electrical connection structures 328$_n$ are arrayed generally symmetrically with respect to axis 318. Electrical connection structures 328$_n$ are illustrated in a preferred embodiment in FIG. 4 as apertures traversing at least a portion of electrical conductor 320$_4$.

Electrical conductors 320$_n$ are electrically isolated from each other and are electrically isolated from power supply bus structures 282, 284. Electrical isolation is effected in FIG. 4 by spacing electrical conductors 320$_n$ and power supply bus structures 282, 284 apart to establish air gaps among electrical conductors 320$_n$ and power supply bus structures 282, 284. Isolating structural barriers manufactured using insulating materials (not shown in FIG. 4) may be inserted among electrical conductors 320$_n$ and power supply bus structures 282, 284 to establish the required electrical isolation if desired.

A first sliding panel 350 is provided substantially aligned with axis 312. An aperture 352 traverses first sliding panel 350. Aperture 352 is large enough to accommodate connection with a connection structure through aperture 352 when first sliding panel 350 is properly situated along axis 312. First sliding panel 350 may be situated in a first position (illustrated in FIG. 4) with aperture 352 substantially aligned with electrical connection structure 322$_2$. In this first position, electrical connection structure 300$_1$ is not covered by first sliding panel 350, and electrical connection structure 322$_2$ is accessible for electrical connection through aperture 352. An electrical bridging unit may be used for establishing such a connection between electrical connection structures 300$_1$, 322$_2$ (see, for example, electrical bridging units 60$_n$, 130$_n$, 230$_n$; FIGS. 1-3). Electrical connecting structures 310$_1$, 322$_1$ are covered or masked by first sliding panel 350 so that no electrical connection may be effected that involves either of electrical connecting structures 310$_1$, 322$_1$ when first sliding panel 350 is in the first position.

A second sliding panel 360 is provided substantially aligned with axis 316. An aperture 362 traverses second sliding panel 360. Aperture 362 is large enough to accommodate connection with a connection structure through aperture 362 when second sliding panel 360 is properly situated along axis 316. Second sliding panel 360 may be situated in a second position (illustrated in FIG. 4) with aperture 362 substantially aligned with electrical connection structure 310$_3$. In this second position, electrical connection structure 326$_1$ is not covered by second sliding panel 360, and electrical connection structure 310$_3$ is accessible for electrical connection through aperture 362. An electrical bridging unit may be used for establishing such a connection between electrical connection structures $310_3$, $326_1$ (see, for example, electrical bridging units $60_n$, $130_n$, $230_n$; FIGS. 1-3). Electrical connecting structures $300_3$, $326_2$ are covered or masked by second sliding panel 360 so that no electrical connection may be effected that involves either of electrical connecting structures $300_3$, $326_2$ when second sliding panel 360 is in the second position.

Sliding panels 350, 360 are preferably configured using electrically isolating material in order to assure that the required electrical isolation among electrical conductors $320_n$ and power supply bus structures 282, 284 is established.

Sliding panels may be provided in aligned positions with one or both of axes 314, 318, if desired. Situating either of sliding panels 350, 360 in the first or second position establishes which connections may be made among various electrical conductors and power supply bus structures. This capability to prevent certain connections being made may be used as a safety feature for apparatuses 10, 80, 180 (FIGS. 1-3). If, by way of example and not by way of limitation, +24 VDC is provided to first power supply bus structure 282 and −48 VDC is provided to second power supply bus structure 284 (FIG. 4), one may preclude provision of +24 VDC power to equipment coupled with electrical conductor $320_3$ by situating second sliding panel 360 in the second position illustrated in FIG. 4 so that no connection may be effected between electrical connection structure $300_3$ (masked by second sliding panel 360) and any electrical connection structure $326_1$, $326_2$ in electrical conductor $320_3$. Further, one may preclude provision of −48 VDC power to equipment coupled with electrical conductor $320_1$ by situating first sliding panel 350 in the first position illustrated in FIG. 4 so that no connection may be effected between electrical connection structure $310_1$ (masked by first sliding panel 350) and any electrical connection structure $322_1$, $322_2$ in electrical conductor $320_1$.

Figure 5:
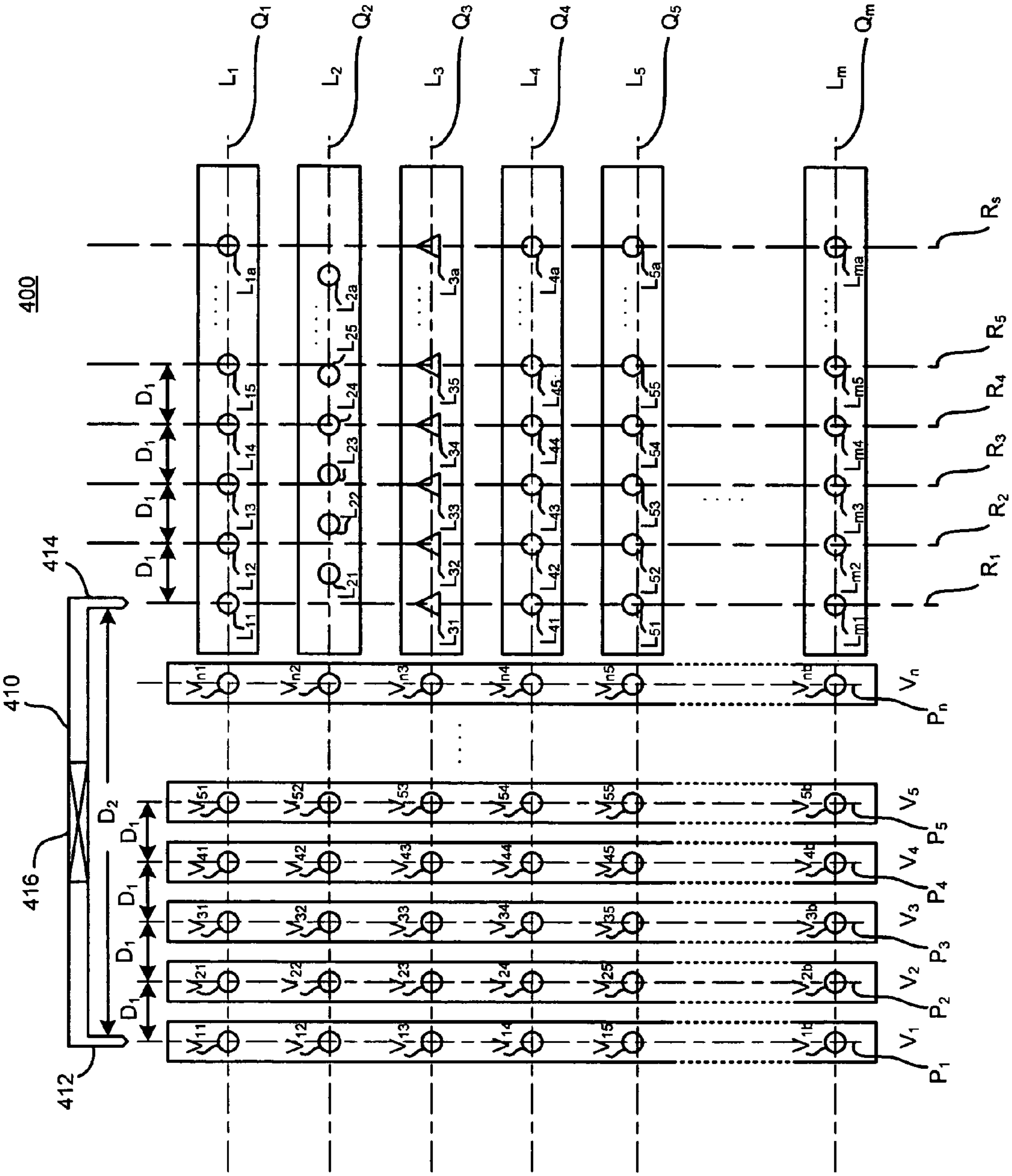
FIG. 5 is a schematic plan view of the apparatus of the present invention configured for operation as a multiple voltage distribution system.

FIG. 5 is a schematic plan view of the apparatus of the present invention configured for operation as a multiple voltage distribution system. In FIG. 5, an apparatus 400 for distributing electrical power includes a plurality of power supply bus structures $V_n$ ($V_1, V_2, V_3, V_4, V_5, \ldots, V_n$) are arranged in substantial alignment with a plurality of parallel axes $P_n$ ($P_1, P_2, P_3, P_4, P_5, \ldots, P_n$) to provide voltages $V_1, V_2, V_3, V_4, V_5, \ldots, V_n$. Axes $P_n$ are separated by a distance $D_1$. Power supply bus structures $V_n$ each includes a plurality of electrical connection structures $V_{nb}$, each respective electrical connection structure is identified in FIG. 5 by its respective power supply bus structure and an identifying numeral. Thus, power supply bus structure $V_1$ includes electrical connection structures $V_{11}, V_{12}, V_{13}, V_{14}, V_{15}, \ldots, V_{1b}$. Power supply bus structure $V_2$ includes electrical connection structures $V_{21}, V_{22}, V_{23}, V_{24}, V_{25}, \ldots, V_{2b}$. Power supply bus structure $V_3$ includes electrical connection structures $V_{31}, V_{32}, V_{33}, V_{34}, V_{35}, \ldots, V_{3b}$. Power supply bus structure $V_4$ includes electrical connection structures $V_{41}, V_{42}, V_{43}, V_{44}, V_{45}, \ldots, V_{4b}$. Power supply bus structure $V_5$ includes electrical connection structures $V_{51}, V_{52}, V_{53}, V_{54}, V_{55}, \ldots, V_{5b}$. Power supply bus structure $V_n$ includes electrical connection structures $V_{n1}, V_{n2}, V_{n3}, V_{n4}, V_{n5}, \ldots, V_{nb}$.

A plurality of electrical conductors $L_m$ ($L_1, L_2, L_3, L_4, L_5, \ldots, L_m$) are arranged in substantial alignment with a plurality of parallel axes $Q_m$ ($Q_1, Q_2, Q_3, Q_4, Q_5, \ldots, Q_m$). Electrical conductors $L_m$ are coupled with respective loads $L_1, L_2, L_3, L_4, L_5, \ldots, L_m$ (not shown in detail in FIG. 5).

A plurality of electrical connection structures $V_{nb}$ ia oriented about each axis $Q_m$. Thus, electrical connection structures $V_{11}, V_{21}, V_{31}, V_{41}, V_{51}, \ldots, V_{n1}$ are oriented about axis $Q_1$. Electrical connection structures $V_{12}, V_{22}, V_{32}, V_{42}, V_{52}, \ldots, V_{n2}$ are oriented about axis $Q_2$. Electrical connection structures $V_{13}, V_{23}, V_{33}, V_{43}, V_{53}, \ldots, V_{n3}$ are oriented about axis $Q_3$. Electrical connection structures $V_{14}, V_{24}, V_{34}, V_{44}, V_{54}, \ldots, V_{n4}$ are oriented about axis $Q_4$. Electrical connection structures $V_{15}, V_{25}, V_{35}, V_{45}, V_{55}, \ldots, V_{n5}$ are oriented about axis $Q_5$. Electrical connection structures $V_{1b}, V_{2b}, V_{3b}, V_{4b}, V_{5b}, \ldots, V_{nb}$ are oriented about axis $Q_m$.

Electrical conductors $L_m$ each includes a plurality of electrical connection structures, each respective electrical connection structure is identified in FIG. 5 by its respective electrical conductor and an identifying numeral. Thus, electrical conductor $L_1$ includes electrical connection structures $L_{11}, L_{12}, L_{13}, L_{14}, L_{15}, \ldots, L_{1a}$. Electrical conductor $L_2$ includes electrical connection structures $L_{21}, L_{22}, L_{23}, L_{24}, L_{25}, \ldots, L_{2a}$. Electrical conductor $L_3$ includes electrical connection structures $L_{31}, L_{32}, L_{33}, L_{34}, L_{35}, \ldots, L_{3a}$. Electrical conductor $L_4$ includes electrical connection structures $L_{41}, L_{42}, L_{43}, L_{44}, L_{45}, \ldots, L_{4a}$. Electrical conductor $L_5$ includes electrical connection structures $L_{51}, L_{52}, L_{53}, L_{54}, L_{55}, \ldots, L_{5a}$. Electrical conductor $L_m$ includes electrical connection structures $L_{m1}, L_{m2}, L_{m3}, L_{m4}, L_{m5}, \ldots, L_{ma}$.

Electrical connection structures $L_{ma}$ are arranged in substantial alignment with a plurality of parallel axes $R_m$. Electrical conductor L2 is an exception to this axial alignrnent to provide a structural rejection feature for apparatus 400, as will be described later herein. Thus, electrical connection structures $L_{11}, L_{31}, L_{41}, L_{51}, \ldots, L_{m1}$ are oriented about axis $R_1$. Electrical connection structures $L_{12}, L_{32}, L_{42}, L_{52}, \ldots, L_{m2}$ are oriented about axis $R_2$. Electrical connection structures $L_{13}, L_{33}, L_{43}, L_{53}, \ldots, L_{m3}$ are oriented about axis $R_3$. Electrical connection structures $L_{14}, L_{34}, L_{44}, L_{54}, \ldots, L_{m4}$ are oriented about axis $R_4$. Electrical connection structures $L_{15}, L_{35}, L_{45}, L_{55}, \ldots, L_{m5}$ are oriented about axis $R_5$. Electrical connection structures $L_{1a}, L_{3a}, L_{4a}, L_{5a}, \ldots, L_{ma}$ are oriented about axis $R_S$.

Some electrical connection structures $L_{ma}$ are separated by distance $D_1$; see, for example, electrical connection structures associated with electrical conductors $L_1, L_3, L_4, L_5, \ldots, L_m$. Electrical connection structures associated with electrical conductor $L_2$ are not separated by distance $D_1$.

A representative electrical bridging unit 410 for effecting selective electrical coupling between a respective power supply bus structure $V_n$ and a respective electrical conductor $L_m$. Bridging unit 410 presents electrical connection structures 412, 414. Bridging unit 410 may include a circuit interrupting structure 416 such as, by way of example and not by way of limitation, a circuit breaker structure, a fuse structure or a similar structure. Electrical connection structures 412, 414 are separated by a distance $D_2$ and are configured for effecting electrically conductive contact with a respective electrical connection structure. If distance $D_2$ is an integer-multiple of distance $D_1$ and separation between axes $P_n$, $R_1$ as an integer-multiple of distance $D_1$, then bridging unit 410 may be used to effect any of several electrical bridge-couplings among power supply bus structures $V_n$ and electrical conductors $L_m$. Thus, electrical bridge unit 410 having a separation of connection structures 412, 414 of distance $D_1$ may be used to connect any of power supply bus structures $V_n$ with electrical connection structures associated with electrical conductors $L_1, L_3, L_4, L_5, \ldots, L_m$. Electrical bridge unit 410 maybe able to effect electrical coupling between some (but not all) of power supply bus structures $V_n$ and some (but not all) of electrical connection structures $L_{2a}$ associated with electrical conductor $L_2$, but the uneven spacing of electrical connection structures associated with electrical conductor $L_2$ precludes compatible connection among all electrical connection structures associated with electrical conductor $L_2$. Varied spacing among electrical connection structures may be employed as a safety feature providing a rejection capability. An electrical bridging unit 410 not appropriate for circuitry or equipment (not shown in FIG. 5) connected with electrical conductor $L_2$ may be unable to effect proper connectivity because the varied spacing of electrical connection structures associated with electrical conductor $L_2$ establishes the separation distance $D_2$ between connection structures 412, 414 as not an integer-multiple of the spacing between electrical connection structures on electrical conductor $L_2$.

Electrical connection structures 412, 414 are preferably configured for effecting a good electrical connection with respective electrical connection structures. By way of example and not by way of limitation, when an electrical connection structure associated with an electrical conductor $L_m$ is configured as a substantially cylindrical aperture, connection structures 412, 414 may be configured as substantially cylindrical conductive posts having compressible expanded panels longitudinally oriented on the posts. The panels are compressed as the connection structure is urged into the cylindrical aperture and the compression fit of the panels within the receiving aperture provides a reliable and firmn electrical connection. Such posts with longitudinal compressible panels are known in the art.

Electrical connection structures may be configured with differing shapes may also be employed to establish a rejection capability for an electrical bridging unit not appropriate for a particular application. For example, establishing spacing $D_2$ as an integer-multiple of distance $D_1$, establishing separation between axes $P_n$, $R_1$ as an integer-multiple of distance $D_1$ and establishing separation of connection structures 412, 414 at distance $D_2$ will properly align connection structures 412, 414 for connection between power supply bus structures $V_n$ and electrical connection structures associated with electrical conductor $L_3$. However, if connection structures 412, 414 are configured for insertion within a cylindrical aperture (e.g. electrical connection structures associated with electrical conductors $L_1$, $L_4$, $L_5$, $L_m$), connection structures 412, 414 will not effect good electrical connection with triangle-shaped electrical connection structures associated with electrical conductor $L_3$. Indeed, with proper cylindrical dimensions, cylindrical connection structures 412, 414 will be completely rejected and not fit at all within the triangle-shaped connection structures associated with electrical conductor $L_3$.

Figure 6:
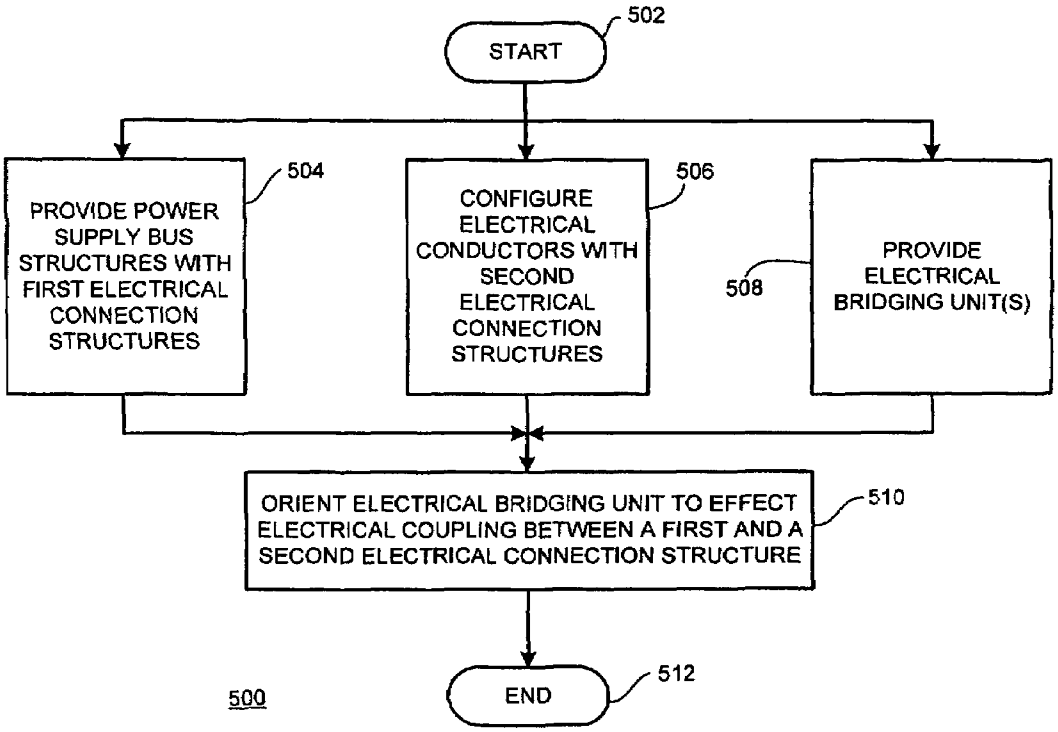
FIG. 6 is a flow chart illustrating the method of the present invention.

FIG. 6 is a flow chart illustrating the method of the present invention. In FIG. 6, a method 500 for distributing electrical power from a plurality of power sources among a plurality of electrical conductors begins at a START locus $50_2$. Method 500 continues by, in no particular order: (1) Providing a plurality of power supply bus structures, as indicated by a block 504. Each respective power supply bus structure of the plurality of power supply bus structures is coupled with at least one respective power source of the plurality of power sources and presents a respective plurality of first electrical connection structures arranged in a respective first spaced array. (2) Configuring each respective electrical conductor of the plurality of electrical conductors to present a respective plurality of second electrical connection structures arranged in a respective second spaced array, as indicated by a block 506. (3) Providing at least one electrical bridging unit, as indicated by a block 508.

Method 500 continues by orienting a respective electrical bridging unit of the at least one electrical bridging unit to effect electrical coupling between a respective first electrical connection structure and a respective second electrical connection structure to establish electrical connection between a selected said respective power supply bus structure and a selected said respective electrical conductor, as indicated by a block 510. Method 500 terminates at an END locus 512.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. An apparatus for distributing electrical power from a plurality of power sources among a plurality of electrical conductors; the apparatus comprising:

(a) a plurality of power supply bus structures; each respective power supply bus structure of said plurality of power supply bus structures being coupled with at least one respective power source of said plurality of power sources and being generally oriented about a respective first longitudinal axis of a plurality of first longitudinal axes; said plurality of first longitudinal axes being generally parallel; each said respective power supply bus structure presenting a respective plurality of first electrical connection structures arranged in a respective first spaced array generally along a respective said first longitudinal axis;

(b) each respective electrical conductor of said plurality of electrical conductors being generally oriented about a respective second longitudinal axis of a plurality of second longitudinal axes; said plurality of second longitudinal axes being generally parallel and generally perpendicular with said plurality of first longitudinal axes; each said respective electrical conductor presenting a respective plurality of second electrical connection structures arranged in a respective second spaced array generally along a respective said second longitudinal axis; and (c) at least one electrical bridging unit; a respective electrical bridging unit of said at least one electrical bridging unit cooperating with a respective first electrical connection structure and a respective second electrical connection structure to establish electrical connection between a selected said respective power supply bus structure and a selected said respective electrical conductor; said respective electrical bridging unit, said respective first electrical connection structure and said respective second electrical connection structure being oriented generally along a selected said respective second longitudinal axis.

2. An apparatus for distributing electrical power from a plurality of power sources among a plurality of electrical conductors as recited in claim 1 wherein said respective plurality of second electrical connection structures are arranged generally along a respective said first longitudinal axis with a first inter-structure spacing, and said respective plurality of second electrical connection structures are arranged generally along said respective second longitudinal axis with a second inter-structure spacing.

3. An apparatus for distributing electrical power from a plurality of power sources among a plurality of electrical conductors as recited in claim 2 wherein said first inter-structure spacing and said second inter-structure spacing are substantially similar along each respective said second longitudinal axis.

4. An apparatus for distributing electrical power from a plurality of power sources among a plurality of electrical conductors as recited in claim 2 wherein said first inter-structure spacing and said second inter-structure spacing are not substantially similar along at least two said respective second longitudinal axes.

5. An apparatus for distributing electrical power from a plurality of power sources among a plurality of electrical conductors as recited in claim 1 wherein said each said respective plurality of first electrical connection structures are arranged generally along a respective said second longitudinal axis having a first structural shape, and each said respective plurality of second electrical connection structures are arranged generally along said respective second longitudinal axis having a second structural shape; said first structural shape and said second structural shape being substantially similar.

6. An apparatus for distributing electrical power from a plurality of power sources among a plurality of electrical conductors as recited in claim 5 wherein said first structural shape and said second structural shape are substantially similar along each respective said second longitudinal axis.

7. An apparatus for distributing electrical power from a plurality of power sources among a plurality of electrical conductors as recited in claim 5 wherein said first structural shape and said second structural shape are not substantially similar along at least two said respective second longitudinal axes.

8. An apparatus for distributing electrical power from a plurality of power sources among a plurality of electrical conductors as recited in claim 1 wherein each said respective plurality of first electrical connection structures are first apertures arranged generally along a respective said second longitudinal axis with a first inter-aperture spacing, each said respective plurality of second electrical connection structures are second apertures arranged generally along said respective second longitudinal axis with a second inter-aperture spacing, and said electrical bridging unit effects connection along said respective second longitudinal axis between a respective said first aperture and a respective said second aperture by a first pin structure proportioned for an electrically conductive fit within said first aperture and a second pin structure proportioned for an electrically conductive fit within said second aperture; said first pin structure and said second pin structure being electrically common.

9. An apparatus for distributing electrical power from a plurality of power sources among a plurality of electrical conductors as recited in claim 8 wherein said first inter-aperture spacing and said second inter-aperture spacing are substantially similar along each said respective second longitudinal axis.

10. An apparatus for distributing electrical power from a plurality of power sources among a plurality of electrical conductors as recited in claim 8 wherein said first inter-aperture spacing and said second inter-aperture spacing are not substantially similar along at least two said respective second longitudinal axes.

11. An apparatus for distributing electrical power from a plurality of power sources among a plurality of electrical conductors; the apparatus comprising:

(a) a plurality of power supply bus structures; each respective power supply bus structure of said plurality of power supply bus structures being coupled with at least one respective power source of said plurality of power sources and presenting a respective plurality of first electrical connection structures arranged in a respective first spaced array;

(b) each respective electrical conductor of said plurality of electrical conductors presenting a respective plurality of second electrical connection structures arranged in a respective second spaced array; and (c) at least one electrical bridging unit; a respective electrical bridging unit of said at least one electrical bridging unit coupling a respective first electrical connection structure and a respective second electrical connection structure to establish electrical connection between a selected said respective power supply bus structure and a selected said respective electrical conductor.

12. An apparatus for distributing electrical power from a plurality of power sources among a plurality of electrical conductors as recited in claim 11 wherein a respective plurality of said first electrical connection structures are arranged generally along a respective axis with a respective first inter-structure spacing, and a respective plurality of said second electrical connection structures are arranged generally along said respective axis with a second inter-structure spacing.

13. An apparatus for distributing electrical power from a plurality of power sources among a plurality of electrical conductors as recited in claim 12 wherein said first inter-structure spacing and said second inter-structure spacing are substantially similar along each respective said axis.

14. An apparatus for distributing electrical power from a plurality of power sources among a plurality of electrical conductors as recited in claim 12 wherein selected first electrical connection structures of at least one said respective plurality of first electrical connection structures have a first structural shape, and selected said respective second electrical connection structures oriented co-axially with said selected first electrical connection structures have a second structural shape.

15. An apparatus for distributing electrical power from a plurality of power sources among a plurality of electrical conductors as recited in claim 14 wherein said first structural shape and said second structural shape are substantially similar along each respective said axis.

16. An apparatus for distributing electrical power from a plurality of power sources among a plurality of electrical conductors as recited in claim 11 wherein selected said respective first electrical connection structures are first apertures arranged according to a first inter-aperture spacing, selected said respective second electrical connection structures are second apertures arranged according to a second inter-aperture spacing, and said electrical bridging unit effects connection between a respective said first aperture and a respective said second aperture by a first pin structure proportioned for an electrically conductive fit within said first aperture and a second pin structure proportioned for an electrically conductive fit within said second aperture; said first pin structure and said-second pin structure being electrically common.

17. An apparatus for distributing electrical power from a plurality of power sources among a plurality of electrical conductors as recited in claim 16 wherein said first electrical connection structures and said second electrical connection structures are arrayed along a plurality of generally parallel axes; said first inter-aperture spacing and said second inter-aperture spacing being substantially similar along each respective axis of said plurality of axes.

18. A method for distributing electrical power from a plurality of power sources among a plurality of electrical conductors; the method comprising the steps of:

(a) in no particular order:

(1) providing a plurality of power supply bus structures; each respective power supply bus structure of said plurality of power supply bus structures being coupled with at least one respective power source of said plurality of power sources and presenting a respective plurality of first electrical connection structures arranged in a respective first spaced array;

(2) configuring each respective electrical conductor of said plurality of electrical conductors to present a respective plurality of second electrical connection structures arranged in a respective second spaced array; and (3) providing at least one electrical bridging unit; and (b) orienting a respective electrical bridging unit of said at least one electrical bridging unit to effect electrical coupling between a respective first electrical connection structure and a respective second electrical connection structure to establish electrical connection between a selected said respective power supply bus structure and a selected said respective electrical conductor.

19. A method for distributing electrical power from a plurality of power sources among a plurality of electrical conductors as recited in claim 18 wherein a respective plurality of said first electrical connection structures are arranged generally along a respective axis with a respective first inter-structure spacing, and a respective plurality of said second electrical connection structures are arranged generally along said respective axis with a second inter-structure spacing.

20. A method for distributing electrical power from a plurality of power sources among a plurality of electrical conductors as recited in claim 18 wherein selected first electrical connection structures of at least one said respective plurality of first electrical connection structures have a first structural shape, and selected said respective second electrical connection structures oriented co-axially with said selected first electrical connection structures have a second structural shape.

* * * * *